United States Patent [19]

Chan

[11] 3,999,719
[45] Dec. 28, 1976

[54] REVERSE MECHANISM FOR TAPE CARTRIDGES

[76] Inventor: Stanley Sue Chi Chan, 5724 Highland Hills Drive, Austin, Tex. 78731

[22] Filed: Mar. 31, 1975

[21] Appl. No.: 563,325

[52] U.S. Cl. .......................... 242/55.19 A; 242/194
[51] Int. Cl.² .................... G11B 15/32; G11B 23/10
[58] Field of Search ............ 242/55.19 A, 194, 200

[56] References Cited
UNITED STATES PATENTS

| | | | |
|---|---|---|---|
| 3,252,670 | 5/1966 | Smith | 242/55.19 A |
| 3,893,757 | 7/1975 | Donnici | 242/55.19 A |
| 3,894,699 | 7/1975 | Bara | 242/55.19 A |

FOREIGN PATENTS OR APPLICATIONS

| | | | |
|---|---|---|---|
| 2,054,106 | 5/1971 | Germany | 242/55.19 A |

Primary Examiner—Richard E. Aegerter
Assistant Examiner—Richard R. Stearns
Attorney, Agent, or Firm—Olsen and Stephenson

[57] ABSTRACT

A tape cartridge is provided having a reverse mechanism which enables recording tape to be driven in the reverse direction in the tape cartridge. The reverse mechanism includes a rewind reel that is mounted in a juxtaposed relation with the tape reel of the tape cartridge so that the rewind reel can rotate independently of the tape reel. A pair of drive wheels, slidably mounted onto the cartridge body and operated by flexible transmission means connected to a tape cartridge drive wheel of the tape cartridge, rotate the tape reel and rewind reel to afford reversible movement of tape in the tape cartridge.

2 Claims, 5 Drawing Figures

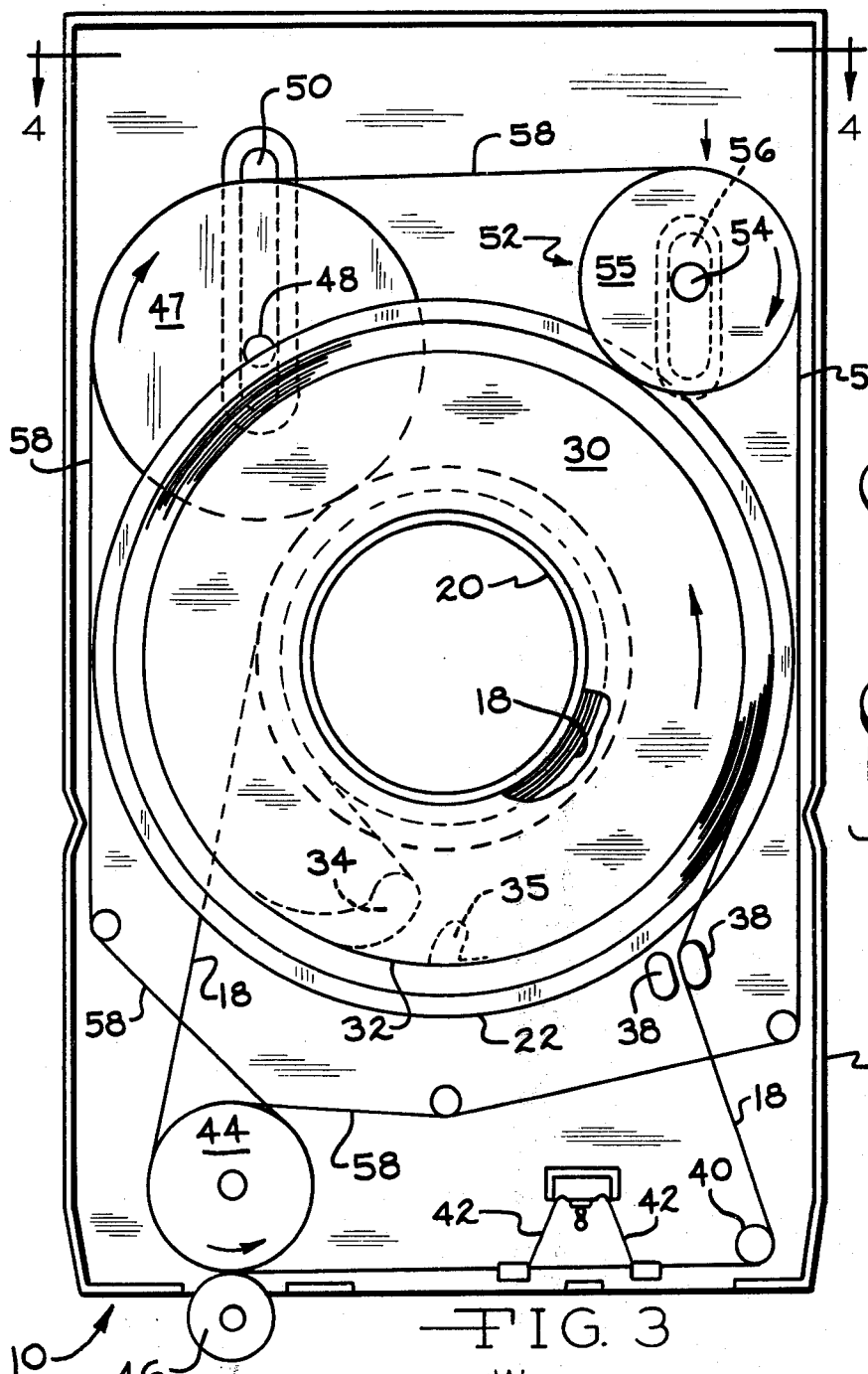
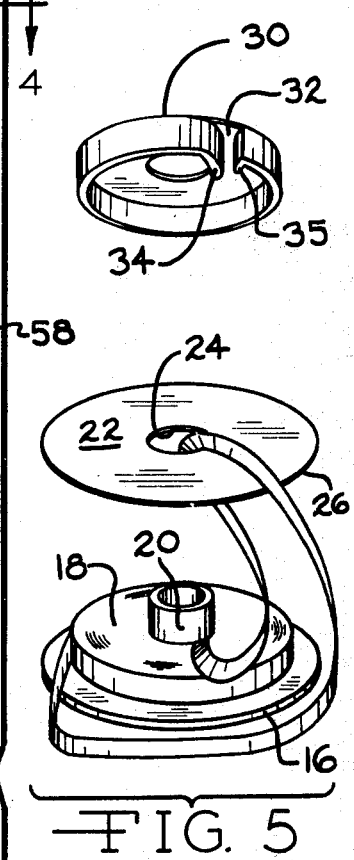
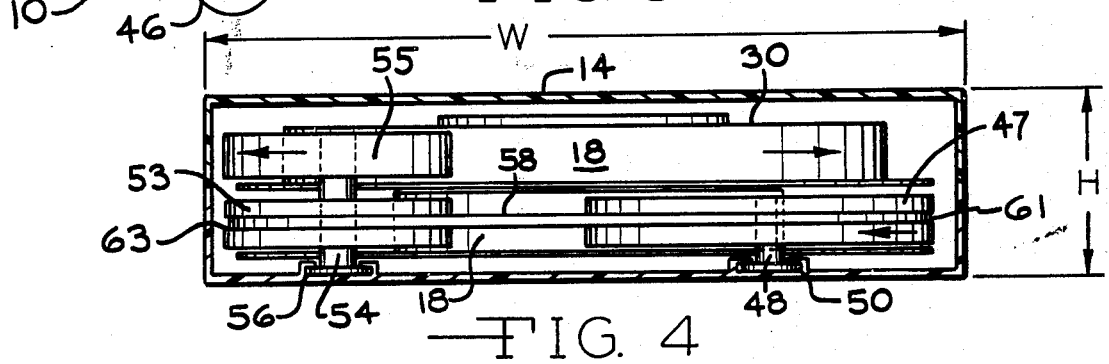

REVERSE MECHANISM FOR TAPE CARTRIDGES

BACKGROUND OF THE INVENTION

The present invention provides a reverse mechanism that can be installed in standard tape cartridges. Conventional tape cartridges which are used for playing and recording sound signals and which operate in tape decks include a single reel about which the playing tape is wound in an endless manner. The manner in which the tape is wound about the reel prevents reversing the directional movement of the tape in conventional tape decks without additional mechanisms. Heretofore, whenever an operator of a tape deck having a cartridge inserted therein wanted to locate a specific position on the tape, the tape could only be moved in the forward direction. Thus, considerable time may be required to locate a desired position on a playing tape. The critical dimensions which are the height and width of tape cartridges are standardized throughout the industry, and it is necessary to accommodate these dimensions in any reverse mechanism.

SUMMARY OF THE INVENTION

The present invention provides a reverse mechanism that can be installed in conventional tape cartridges. Thus, with only minor modifications in conventional tape decks, it is easy for an operator to locate a desired position on the tape by either moving the tape forward or by moving the tape in the reverse direction. Accordingly, it is an object of this invention to provide a reverse mechanism which installs in conventional tape cartridges and operates to rewind the tape when the tape's movement is reversed by a conventional tape deck, thus providing a simple efficient reverse mechanism that is readily adaptable to fit in standardized tape cartridges.

Tape cartridges have a tape reel upon which tape is wound about in an endless manner. When the tape cartridge is inserted in a tape deck capable of operating in reversible directions, a rotatable tape deck drive wheel drives the tape by pressing the tape against the freely rotating tape cartridge drive wheel mounted on the cartridge. In the forward direction, as tape is being pulled from the tape reel, tape that has already been pulled past the tape deck heads is simultaneously being wound about the tape reel over previously wound tape.

The reverse mechanism of the present invention comprises a rewind reel having a slot formed in its peripheral surface to allow passage of tape therethrough and a pair of rewind drive wheels that are driven by flexible power transmission means such as a rubber band which is impelled by the tape cartridge drive wheel. The rewind drive wheels include a tape reel drive wheel and a rewind reel drive wheel. The rewind drive wheels are slidably mounted in slots formed on the tape cartridge and provide continual static forces against the rewind reel and the tape reel. The rewind reel drive wheel is of a ratchet-type design so that when the tape deck runs in the forward direction no rotational forces will be transmitted to the rewind reel. However, when the tape deck drives the tape cartridge in the reverse direction, the rewind reel drive wheel will rotate the rewind reel in the reverse direction to take up the tape that had been previously wound on the tape reel. The tape reel drive wheel, which also is driven by the rubber band, applies constant rotational forces to the tape reel in both the forward and the reverse directions. The tape reel drive wheel rotates the tape reel in reversible directions so that tape being removed from one of the reels can be taken up by the other reel.

In the forward playing or recording cycle, tape is being pulled from the tape reel through the slot formed in the rewind reel, past the heads of the tape deck and is wound back onto the tape reel over previously wound tape. In this direction, the rewind reel drive wheel does not exert any rotational forces on the rewind reel which is in a stationary position. The tape reel drive wheel, however, rotates the tape reel in the forward direction. When it is desired to reverse the tape cartridge, the appropriate tape deck control will be switched on and the rewind reel drive wheel rotates the rewind reel in the reverse direction. As the rewind reel rotates in the reverse direction, it winds the tape about its periphery. At the same time, the tape reel drive wheel rotates the tape reel in the reverse direction so the tape may be taken off the tape reel at the same speed that it is being taken up by the rewind reel. Thus, the desired position of the tape can be located by this reverse cycle.

With tape wound about both the rewind reel and the tape reel, the forward cycle will operate as follows. The tape deck is switched on to run in the forward direction. The rewind reel drive wheel exerts no rotational forces upon the rewind reel, while the tape reel drive wheel rotates the tape reel in the forward direction. The tape deck drives the tape in the forward direction and the tension in the tape rotates the rewind reel in the forward direction to remove the tape from the rewind reel. Simultaneously, the tape reel drive wheel rotates the tape reel in the forward direction so that the tape being removed from the rewind reel will be taken up by the tape reel at a constant rate. When all tape has been removed from the rewind reel, the rewind reel will stop rotating in a position so that the tape which now is being removed from the inner most portion of the tape reel can play past the heads of the tape deck without any obstruction.

Further objects, features and advantages of this invention will become apparent from a consideration of the following description, dependent claims, and the accompanying drawing in which:

FIG. 3 is a diagrammatic top view of the tape cartridge of FIG. 2 but showing the tape cartridge in the reverse cycle;

FIG. 4 shows an end view of the tape cartridge taken substantially at line 4—4 of FIG. 3; and FIG. 5 is an exploded view showing components of the tape reel and the rewind reel.

Figure 1:
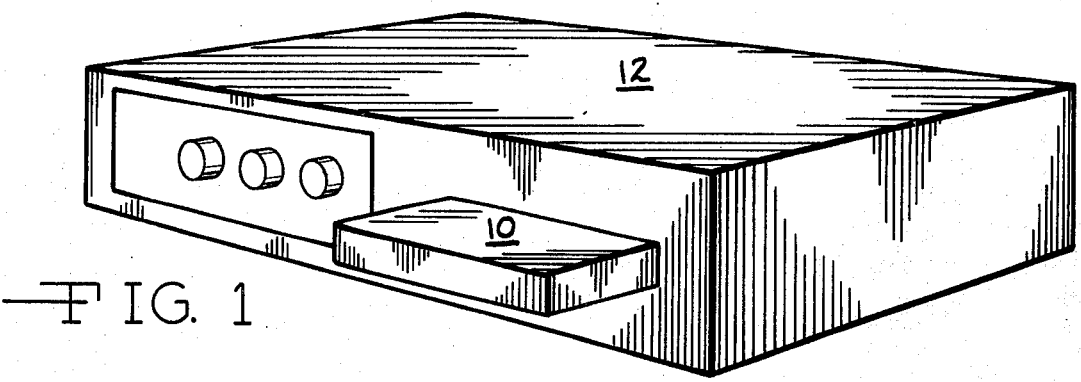
FIG. 1 is a perspective view showing the tape cartridge inserted in the conventional tape deck.

Referring to the drawings, a tape cartridge is shown generally at 10 in FIG. 1. The tape cartridge 10 is operable in conventional tape decks 12 (FIG. 1), which can play and/or record sound signals on the tape wound in the tape cartridge 10. The tape cartridge 10 comprises a cartridge body 14 formed of such suitable material as plastic. The dimensions of the cartridge body 14, that is the height H and width W (FIG. 4), are standardized in the art so that all tape cartridges may be inserted into similarly standardized tape decks.

A tape reel 16 is rotatably mounted onto the cartridge body 14 and tape 18 is wound about the reel 16 in an endless manner. The tape 18 is loosely wound about the tape reel 16 so as to accommodate any tightening that can take place during the rewind cycle. The tape reel 16, formed of such suitable material as low friction plastic to allow easy rotation of the tape reel 16 in the tape cartridge 10, has an inner shaft 20 (FIG. 5). The tape 18 is wound about the shaft 20 so that the tape 18 leaves the reel 16 at a position adjacent to the shaft 20 and then rewinds around previously wound tape as shown in FIG. 5. A thin disk 22, having an inner surface 24 and an outer surface 26 is rotatably mounted on shaft 20. The disk 22 retains the tape 18 on the reel 16. Also, the tape 18 is threaded between the shaft 20 and the inner surface 24 of the disk 22 as it leaves the tape reel 16 to insure that the tape 18 leaves the reel 16 at the proper location. A rewind reel 30 mounts on the shaft 20 of the tape reel 16 and is positioned adjacent to the disk 22. As can be seen in FIG. 5, the rewind reel 30 comprises a circular disk having a slot 32 formed therein through which the tape 18 can pass. A curved bearing member 34 is formed adjacent to the slot 32 and is the surface upon which the tape 18 presses when the rewind reel 30 is taking up the tape 18. A similarly shaped curved bearing surface 35 is located opposite the bearing surface 34 at the slot 32 to prevent tape breakage. The diameter of the outer surface of the rewind reel 30 is substantially equal to the diameter of the tape 18 when all of it is wound about the tape reel 16. In the present invention, the diameter $d_1$ of rewind reel 30 is slightly larger than the diameter $d_2$ of the tape 18 wound about tape reel 16 (FIG. 2), so that the rewind reel 30 can take up the tape 18 as it is being removed from the tape reel 16. When the tape cartridge 10 operates in the forward direction and there is no tape on the rewind reel 30, the tape 18 will be pulled through the slot 32 while the rewind reel 30 remains motionless.

Figure 2:
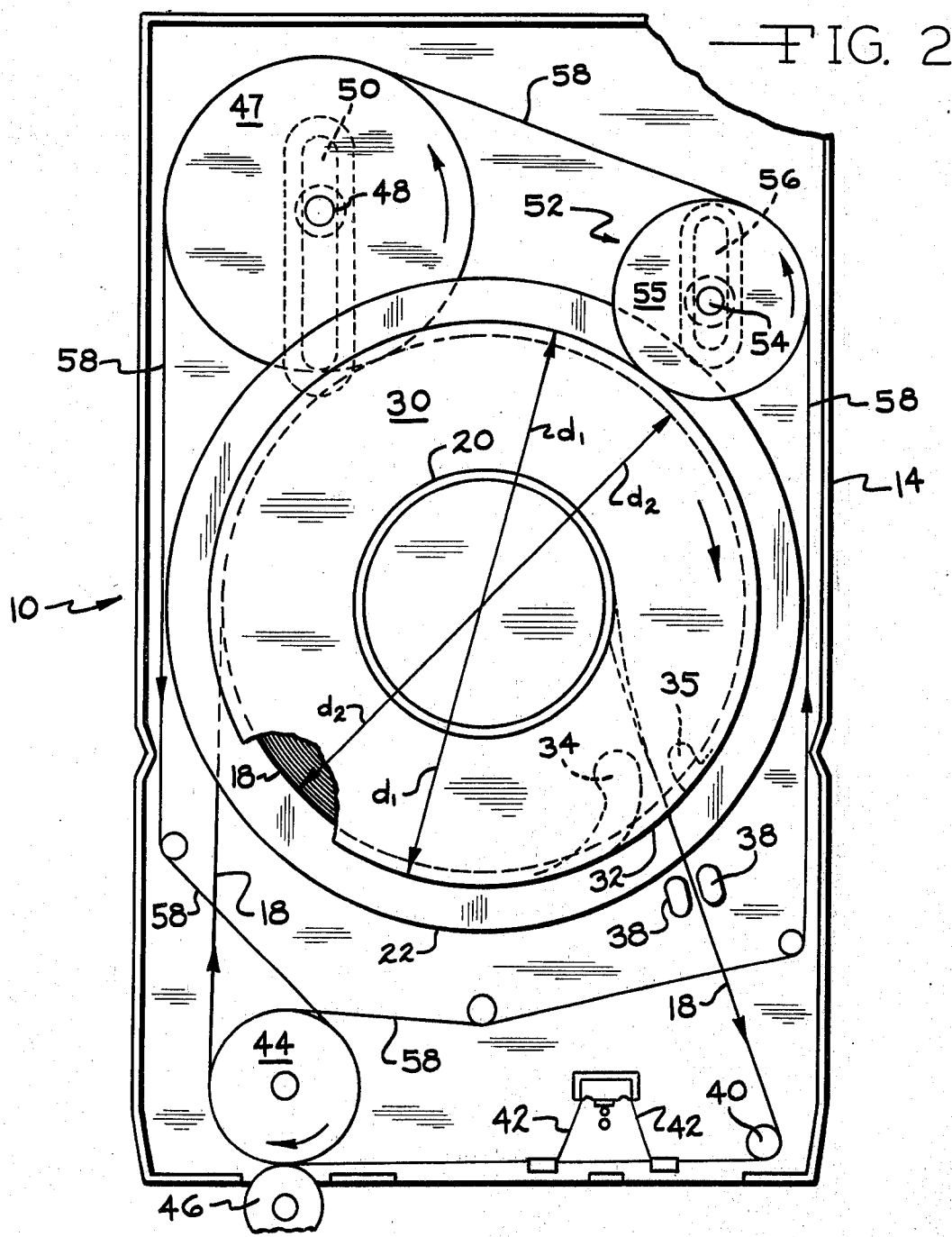
FIG. 2 shows a diagrammatic top view of the tape cartridge with the tape reel and the rewind mechanism.

As can be seen in FIG. 2, the tape 18, after being threaded through the slot 32, is passed through guide members 38 and around guide post 40. The tape 18 is then threaded past pressure member 42. The pressure member 42 functions to press the tape 18 against the heads (not shown) of the tape deck 12. The tape 18 is then passed between a freely rotating tape cartridge drive wheel 44 and a tape deck drive wheel 46 of the tape deck 12. The tape deck drive wheel 46 of the tape deck 12 presses the tape against the tape cartridge drive wheel 44. When the tape deck drive wheel 46 rotates in the forward direction, the tape 18 is pulled from the tape reel 16 at a position adjacent to the shaft 20. Simultaneously, the tape 18 winds about the reel 16 over previously wound tape.

The drive mechanism of the rewind apparatus comprises a pair of drive wheels. The first is tape reel drive wheel 47, which rotates the tape reel 16 by applying rotational pressure against the tape 18 on the reel 16. The drive wheel 47 is rotatably mounted on a shaft 48 which is fitted into the slot 50 that is formed in the cartridge body 14. This construction allows the wheel 47 to move longitudinally compensating for the varying amounts of tape 18 that may be wound about the tape reel 16. The drive wheel 47 applies constant rotational pressure in both the forward and reverse directions against the tape 18 that is wound about the tape reel 16. This insures that the tape reel 16 will rotate at the proper speed. A rewind reel drive wheel 52 is rotatably mounted on a shaft 54 that is slidably mounted in slot 56 which is formed in the cartridge body 14 and provides rotational motion to the rewind reel 30.

The rewind reel drive wheel 52 is of a ratchet design comprising wheels 53 and 55 mounted on the shaft 54 that is slidably mounted onto the cartridge body 14. The wheel 53 is affixed to the shaft 54 so that both the shaft 54 and the wheel 53 can rotate in reversible directions. The wheel 55 attaches to the shaft 54 with a conventional ratchet assembly so that the wheel 55 will be forcibly rotated only when the wheel 53 and the shaft 54 rotate in the reverse direction. In the illustrated embodiment, this reverse direction would be clockwise. In the counter-clockwise, or forward direction, the wheel 55 does not engage the shaft 54 so that no rotational forces are applied against the rewind reel 30. Thus, as constant static pressure is applied by the wheel 55 against the rewind reel 30, only rotational forces in the reverse direction can be applied by the wheel 55. Flexible transmission means connects the tape cartridge drive wheel 44 with the drive wheels 47 and 52. In the illustrated embodiment, a rubber band 58 drives the drive wheels 47 and 52. The rubber band 58 wraps around the tape cartridge drive wheel 44 in a criss-cross manner as shown in FIGS. 2 and 3, and is then stretched around the slot 61 of the drive wheel 47 and the slot 63 of the wheel 53 of the rewind reel drive wheel 52. Although a rubber band 58 is presently used, it is within the purview of this invention that means other than the rubber band 58 may be used to provide rotational motion to the tape reel drive wheel 47 and the rewind reel drive wheel 52.

In operation, the tape cartridge 10 is inserted into the tape deck 12 for either playing or recording purposes. In the forward direction, the tape deck drive wheel 46 applies counter-clockwise rotational forces to the tape cartridge drive wheel 44 to rotate it clockwise. The force and pressure exerted by the tape deck drive wheel 46 on the tape 18 against the wheel 44 pulls the tape 18 through the tape cartridge 10 in such a manner as is shown in FIG. 2. In this forward direction the tape 18 is pulled off the reel 16 from the innermost portion of the tape 18 adjacent to the shaft 20. As the tape 18 is pulled from the tape reel 16, it passes through the slot 32 of the rewind reel 30, proceeds past the guide members 38, around the guide post 40, past the pressure members 42 which presses the tape 18 against the heads (not shown) of the tape deck 12, between the tape deck drive wheel 46 and the tape cartridge drive wheel 44, and then back to be wound on the tape reel 16 over previously wound tape. Thus, sound signals may either be recorded onto or played from the tape 18.

As the tape cartridge drive wheel 44 is driven by the tape deck drive wheel 46 of the tape deck 12, rotational motion is transmitted by the rubber band 58 to the drive wheel 47 and the rewind reel drive wheel 52. In the forward direction, the drive wheel 47 rotates in a counter-clockwise direction rotating the tape reel 16 in a clockwise direction. This clockwise directional movement of the tape reel 16 causes tape to be pulled off the tape reel 16 at a position adjacent to the shaft 20, through the guide members 38 around the guide post 40, across the heads (not shown) of the tape deck 12, and then rewound onto the tape reel 16.

FIG. 3 shows the relationship of the components of the tape cartridge 10 in the reverse cycle where the rewind reel 30 has tape 18 wound about itself. As can be seen, the rewind reel drive wheel 52 has moved longitudinally away from the rewind reel 30 in order to compensate for the amount of tape 18 that has been wound about the reel 30. Similarly, the tape reel drive wheel 47 has moved substantially closer to the tape reel 16. In the reverse direction, the tape deck drive wheel 46 of the tape deck 12 rotates in a clockwise direction, thus rotating the tape cartridge drive wheel 44 in a counter-clockwise direction pulling the tape 18, which is to be wound about the rewind reel 30 from the tape reel 16. The rubber band 58 translates this counter-clockwise motion force to the tape reel drive wheel 47 and the rewind reel drive wheel 52. In the reverse direction, the tape reel drive wheel 47 rotates clockwise, thus turning the tape reel 16 in a counter-clockwise direction. The wheel 53 rotates in a clockwise direction, turning the shaft 54 and the wheel 55 in the same direction. The rewind reel 30, thus, is rotated in a counter-clockwise direction to take up the tape 18. When the rewind reel 30 begins reversible rotation, the tape 18 bears against the curved member 34, thus preventing tape breakage at the point where the tape 18 contacts the reel 30 at the slot 32. As reverse continues, the rewind reel takes on additional tape 18 and thus rotates at a slower rate than the tape reel 16, which must rotate at a faster rate to give up the tape 18 being taken up by the rewind reel 30. The higher rate of rotation of the tape reel 16 in the reverse direction pulls the tape 18 from the inner most portion of the tape reel 16 and wraps it around the shaft 20. The tape 18 thus must initially be loosely wound about the tape reel 16 to accommodate for this relative motion.

Once the desired amount of tape 18 has been wound about the rewind reel 30, the tape deck can be switched to run in the forward direction. In the forward direction, the tape deck drive wheel 46 of the tape deck 12 rotates in a counter-clockwise direction. With the tape deck drive wheel 46 pressing the tape 18 against the wheel 44, the tape 18 is pulled in the forward direction. The clockwise rotation of wheel 44 is transmitted by the rubber band 58 to the tape reel drive wheel 47 and the rewind reel drive wheel 52. The tape reel drive wheel 47 rotates counter-clockwise to drive the tape reel 16 in a clockwise direction to take up the tape 18 being removed from the rewind reel 30. The rewind reel drive wheel 52 does not transmit any rotational forces of the rubber band 58 to the rewind reel 30. The wheel 53 and the shaft 54 rotate counter-clockwise, and the wheel 55 follows the tape. Thus, the clockwise rotation of the rewind reel 30 is determined by the pulling force of the tape 18 as it is being driven in the forward direction by the tape deck drive wheel 46. Such motion takes place until all of the tape 18 has been removed from the rewind reel 30.

When the forward cycle is started, the tape reel 16 initially rotates at a faster rate than does the rewind reel 30, thus unwinding the tape 18 that had been wound around the shaft 20 during reverse. The tape 18 is simultaneously being removed from the rewind reel 30 and taken up on reel 16. As the forward cycle continues, the rewind reel 30 will begin rotating at substantially the same rate as does the tape reel 16 until all of the tape 18 is removed from the rewind reel 30. The rewind reel 30 stops substantially in the position shown in FIG. 2, at which time the tape 18 will be pulled from the reel 16. As has been previously noted, the rewind reel drive wheel 52 does not exert any forward rotational forces on the rewind reel 30 when the tape cartridge is being operated in the forward direction. Thus, with no forces exerted on the rewind reel 30, it may be maintained in the position shown in FIG. 2 when all of the tape has been removed. In the present embodiment, the rewind reel 30 can take up all but a small amount of the tape 18 from the tape reel 16. A small amount of tape 18 must remain on the tape reel 16 so that when the forward cycle is started after reverse, the tape reel 16 can take up the tape 18. Any suitable well known control mechanism can be used to insure that the rewind motion will be stopped with a miminum amount of tape on the reel 16.

As can readily be seen, a rewind mechanism is provided for a conventional tape cartridge 10. This rewind mechanism comprises a rewind reel 30, a tape reel drive wheel 47 that rotates a conventional tape reel 16 and a rewind reel drive wheel 52 which rotates the rewind reel 30 in the reverse direction. Rotational forces are transmitted from the tape deck drive wheel 46 of the tape deck 12 through the drive wheel 44 and to the drive wheel 47 and 52. This rewind apparatus is unique in that it may be installed within the critical dimensions of conventional tape cartridges 10. Thus, there is no need for changes in the critical standardized dimensions of either a tape cartridge 10 or a tape deck 12. Hence, the present invention will allow an inexpensive addition of the rewind mechanism to tape cartridges 10.

What is claimed is:

1. A tape cartridge having a cartridge body, a rotatable tape reel mounted on said cartridge body, recording tape wound about said tape reel in an endless manner and having inner and outer loops, a rotatable tape drive wheel mounted on said cartridge body and spaced from said tape reel, said tape extending from said tape reel along a predetermined path about said tape drive wheel and back to said tape reel, said tape drive wheel being adapted to be drivingly rotated so as to move said tape on said reel in forward and reverse directions, said tape during forward movement thereof being removed from said inner loop and being wound onto said outer loop; rewind apparatus comprising a rotatable rewind reel mounted on said cartridge body in coaxial relation with said tape reel, means forming an opening in the periphery of said rewind reel, said tape extending from said inner loop and through said opening, and means on said rewind reel adjacent said opening for engaging said tape during the movement thereof in said reverse direction, a rotatable tape reel drive wheel mounted on said cartridge body for back and forth movement toward and away from said tape reel, a rotatable rewind reel drive wheel mounted on said cartridge body for back and forth movement toward and away from said rewind reel, and flexible transmission means being operatively connected to said tape drive wheel and said tape reel drive wheel and said rewind reel drive wheel so as to continually urge said tape reel drive wheel toward said tape reel and into continuous engagement therewith and drive said tape reel drive wheel at least in the reverse direction, and continually urge said rewind reel drive wheel toward said rewind reel and into continuous engagement therewith and drive said rewind reel drive wheel only in the reverse direction, whereby on movement of said tape in said reverse direction by said tape drive wheel said tape is removed from said outer loop on said tape reel and is wound about said rewind reel.

2. Rewind apparatus according to claim 1 wherein said rewind reel drive wheel comprises a ratchet wheel operable to drive said rewind reel only in a direction corresponding to said reverse direction of said tape.

* * * * *